(12) United States Patent
Irion et al.

(10) Patent No.: US 7,177,748 B2
(45) Date of Patent: Feb. 13, 2007

(54) DEVICE AND METHOD FOR CONTROLLING A MOTOR VEHICLE TRAVEL SPEED

(75) Inventors: Albrecht Irion, Stuttgart (DE); Dirk John, Leonberg (DE); Stephan Dorenkamp, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 10/539,917

(22) PCT Filed: Feb. 11, 2004

(86) PCT No.: PCT/DE2004/000245

§ 371 (c)(1),
(2), (4) Date: Jun. 16, 2005

(87) PCT Pub. No.: WO2004/080746

PCT Pub. Date: Sep. 23, 2004

(65) Prior Publication Data

US 2006/0047402 A1    Mar. 2, 2006

(30) Foreign Application Priority Data

Mar. 12, 2003   (DE) ............................ 103 11 192

(51) Int. Cl.
*G06F 7/00*    (2006.01)
*B60T 7/12*    (2006.01)

(52) U.S. Cl. ..................... 701/93; 701/96; 340/903

(58) Field of Classification Search ............... 701/36, 701/93, 96, 300, 301; 180/167, 168, 169, 180/170–179; 340/435, 436, 903, 904, 937
See application file for complete search history.

(56) References Cited

U.S. PATENT DOCUMENTS

| 6,282,483 | B1 |   | 8/2001 | Yano et al. |
| 6,347,274 | B2 | * | 2/2002 | Kuramochi et al. .......... 701/96 |
| 6,438,491 | B1 | * | 8/2002 | Farmer ....................... 701/301 |
| 6,496,770 | B2 | * | 12/2002 | Winner et al. ................ 701/96 |
| 6,609,057 | B2 | * | 8/2003 | Miller et al. .................. 701/96 |
| 6,636,148 | B2 | * | 10/2003 | Higuchi ..................... 340/436 |

FOREIGN PATENT DOCUMENTS

| DE | 195 23 111 | 1/1997 |
| DE | 100 15 300 | 10/2001 |
| DE | 100 47 748 | 4/2002 |

* cited by examiner

*Primary Examiner*—Richard M. Camby
(74) *Attorney, Agent, or Firm*—Kenyon & Kenyon LLP

(57) ABSTRACT

A device and a method for cruise control in a motor vehicle, the cruise control being performable as a constant-distance regulation if at least one preceding vehicle has been detected by a radar sensor, or cruise control being performable as a constant-speed regulation if no preceding vehicle has been detected by a radar sensor. Measured object values for detected objects are supplied to the cruise control, which includes a computing device which determines an acceleration gradient for each measured value of each object and adds the individual acceleration gradients of the measured values for each object and outputs the added-up acceleration gradients for the object selected as the target object.

10 Claims, 2 Drawing Sheets

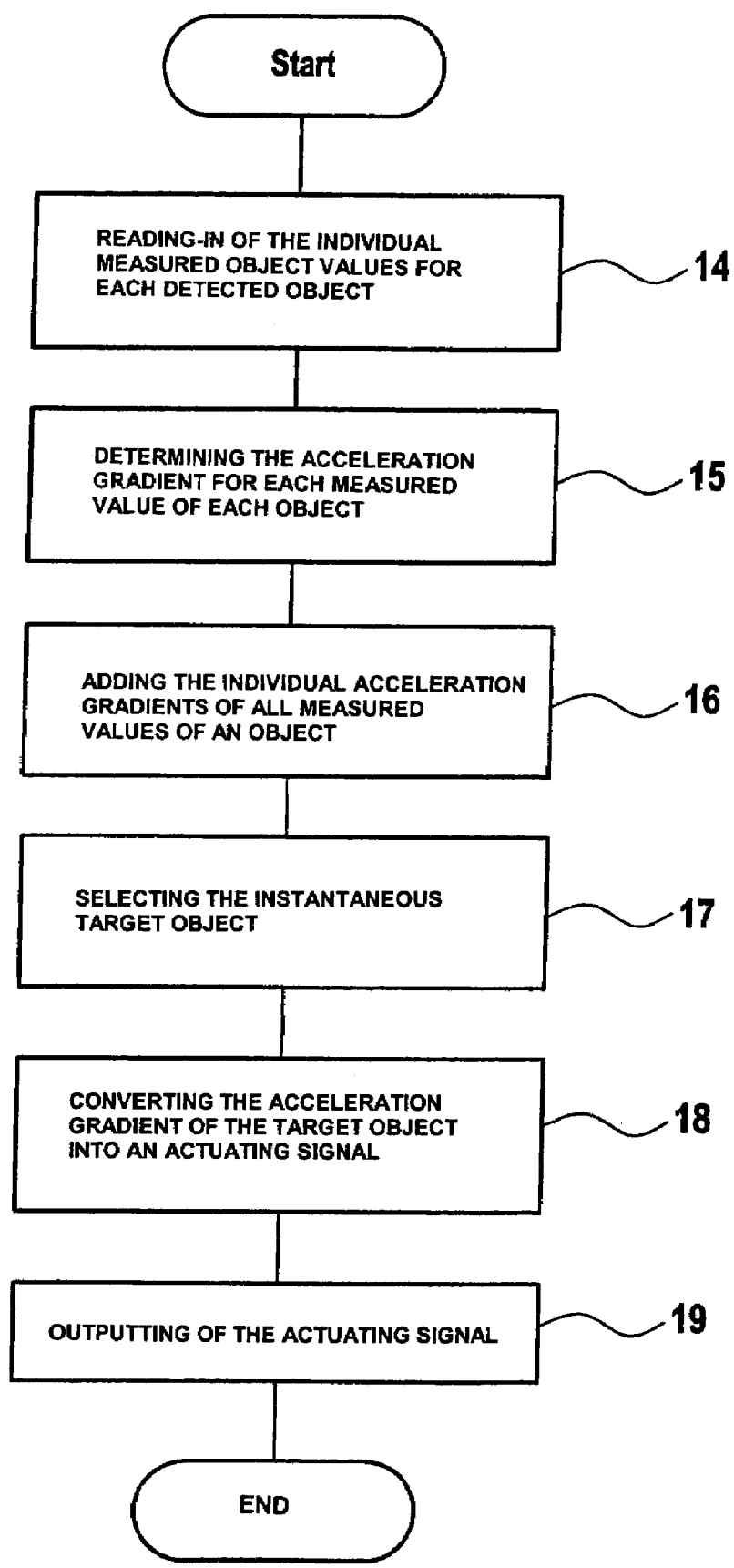

DEVICE AND METHOD FOR CONTROLLING A MOTOR VEHICLE TRAVEL SPEED

FIELD OF THE INVENTION

The present invention relates to a device and a method for controlling the speed of a motor vehicle, the cruise control being performable as a constant-distance regulation if at least one preceding vehicle has been detected by a radar sensor, or the cruise control being performable as a constant-speed regulation if no preceding vehicle has been detected by a radar sensor. Measured object values for known objects are supplied to the cruise control, which includes a computing means which determines an acceleration gradient for each measured value of each object and adds up the individual acceleration gradients of the measured values for each object and outputs the added-up acceleration gradients for the object selected as the target object.

BACKGROUND INFORMATION

The publication "Adaptive Cruise Control System Aspect and Development Trends" by Winner, Witte, Uhler and Lichtenberg, published at the SAE International Congress and Exposition, Detroit, Feb. 26–29, 1996 (SAE paper 961010), describes an adaptive cruise control which emits a radar beam and receives the portion of the beam reflected by stationary objects and preceding vehicles. If this cruise control recognizes a preceding vehicle, cruise control is performed as a constant distance regulation in relation to the preceding vehicle. If the radar system does not detect a preceding vehicle, cruise control is performed as a constant-speed regulation at a set speed defined by the driver. The accelerations and changes in acceleration over time implementable by adaptive cruise controls are limited here by fixed maximum values, because the adaptive cruise control is intended as a comfort system for driver support and therefore aims at a comfortable driving characteristic. The disadvantage of such systems in which the acceleration gradients are determined independently of the dynamic data of preceding vehicles is that these acceleration jolts cause discomfort. In non-critical situations, for example, when approaching a preceding vehicle at a low relative speed, the fixedly predefined acceleration jolt is perceived as too high and therefore uncomfortable, and in situations in which a collision is to be avoided, for example, when approaching a preceding vehicle at a high relative speed, the deceleration gradient is too low, so that driver intervention is generally necessary. In the context of the present invention, the term "acceleration" is used for both positive accelerations and negative accelerations, i.e., decelerations.

SUMMARY OF THE INVENTION

A core of the present invention is to provide a method and a device for determining the acceleration jolts, i.e., the acceleration gradients, as a function of the particular situations in such a way that they match the need for acceleration or deceleration.

At least one of the following measured values or a combination thereof is supplied to the input circuit as an input variable: distance of the object from the host vehicle, relative speed of the object in relation to the host vehicle, longitudinal acceleration of the object, transverse offset of the object, transverse speed of the object, or transverse acceleration of the object. Transverse offset is understood here as the distance in the transverse direction of the preceding vehicle to the previously calculated driving lane trajectory of the host vehicle. In the case of straight-line driving, the driving lane path of the host vehicle is the prolonged longitudinal vehicle axis, and in the case of cornering it is an interpolated movement path, approximated to the curve radius, along which the host vehicle will most probably travel.

It is furthermore advantageous that the acceleration gradient for each measured value of each object is determined using a computing device or a table lookup device. Depending on the complexity of the computation, it may be simpler and faster to compute the particular acceleration gradient using a mathematical formula or to look it up in a previously computed and stored table of values.

The sum of the acceleration gradients for each object is advantageously not greater than a predefinable threshold value which may be output by the cruise control as a maximum. This threshold value which may be output by the cruise control as a maximum may be configured to be variable, so it may respond differently to different situations. Providing such a limiting value prevents excessive acceleration jolts, which would result in a high degree of discomfort.

It is furthermore advantageous that the vehicle immediately preceding the host vehicle is selected as the target object. The target object is the preceding vehicle whose vehicle dynamics affects the adaptive cruise control of the host vehicle. Acceleration or deceleration of the target object results in similar motion dynamics of the host vehicle, because the target object is the vehicle that is to be followed.

The implementation of the method according to the present invention in the form of a control element which is provided for a control unit of an adaptive cruise control system of a motor vehicle is of particular importance. A program which is suitable for being run on a computer, on a microprocessor or signal processor in particular, and for carrying out the method according to the present invention is stored in the control element. Therefore, in this case, the present invention is implemented by a program stored in a control element, so that this control element provided with the program represents the present invention, as does the method which the program is suitable for carrying out. In particular, electrical memory media, a read-only memory for example, may be used as a control element.

BRIEF DESCRIPTION OF THE DRAWINGS

FIG. 2 shows an exemplary embodiment of the method according to the present invention.

DETAILED DESCRIPTION

Figure 1:
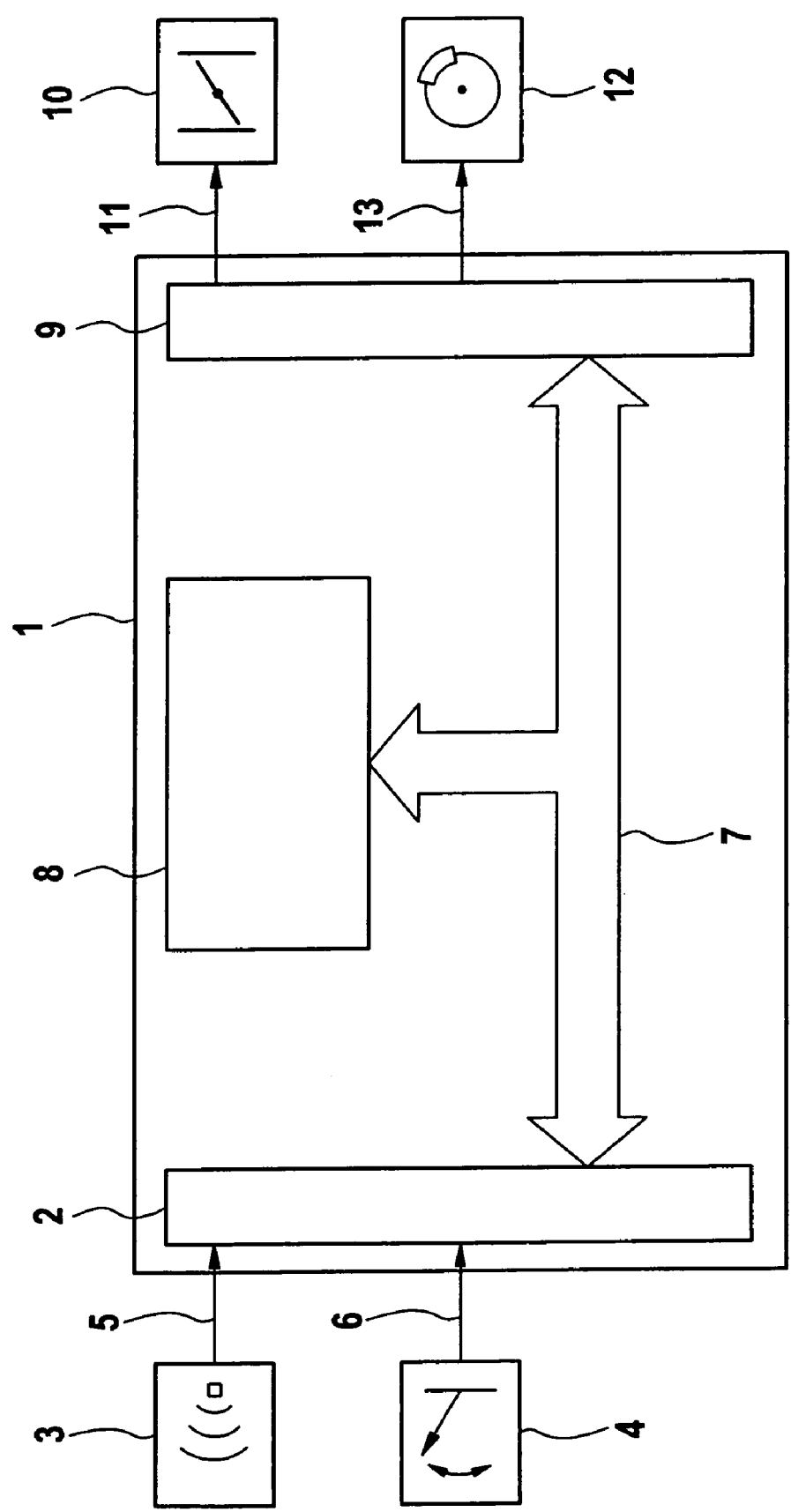
FIG. 1 shows an exemplary embodiment of the device according to the present invention.

FIG. 1 shows an adaptive cruise control and distance regulator 1 which has an input circuit 2 among other things. Adaptive cruise control and distance regulator 1 receives input signals via input circuit 2. Input circuit 2 receives, among other things, signals containing object data 5. This object data 5 or object signals 5 are generated by a radar transceiver device 3. Radar transceiver device 3 emits microwave radiation, which is reflected by vehicles and objects in the detection area and is received by radar sensor 3. From these measured values, the distance of the object from the host vehicle, the relative speed of the object in relation to the host vehicle, the longitudinal acceleration of the object, the transverse offset of the object, i.e., lateral offset of the object with respect to the previously computed movement path of the host vehicle, the transverse speed of the object, and the transverse acceleration of the object are computed for each detected object. Optionally all, or any desired combination of, the above-listed quantities are output to input circuit 2 in the form of object data 5. Furthermore, additional input signals 6 are supplied to input circuit 2, for example, control signals 6 which originate from an operating and control device 4. Operating and control device 4 has driver-actuatable operating elements, via which the driver may put adaptive cruise control and distance regulator 1 into operation and may modify its operational settings. Furthermore, input circuit 2 may receive additional quantities, for example, the speed of the host vehicle and additional information for carrying out further cruise control functions.

The input data supplied via input circuit 2 is supplied to a computing device 8 via a data exchange device 7, actuating signals to be output to downstream devices being determined from the input quantities in computing device 8.

The actuating signals determined by computing device 8 are in turn supplied to data exchange device 7, which supplies these actuating signals to an output circuit 9, which outputs an acceleration request signal 11 or a torque request signal 11 to an output power-determining actuating element 10 of an internal combustion engine. Output power-determining actuating element 10 is preferably designed as an electrically actuatable throttle valve or as a fuel metering device, for example, in the form of a fuel injector. If computing device 8 determines that the host vehicle is to be accelerated or a positive output power is required from the internal combustion engine, this acceleration or torque request signal is output to the internal combustion engine. Similarly, if computing device 8 has determined a deceleration request, a deceleration signal 13 is output to decelerating device 12 of the vehicle. Deceleration device 12 is preferably an electrically actuatable brake system; however, it may also be another deceleration means such as a retarder or an engine brake. Because fixedly predetermined acceleration jolts or deceleration jolts have been found excessively strong or excessively weak depending on the situation, the method according to the present invention in the form of a control program to avoid these disadvantages is provided in computing device 8. This method which is used in computing device 8 is illustrated in the form of a flow chart in FIG. 2.

FIG. 2 shows a flow chart for performing a regulation method for the above-described cruise control. At the start of the method, the individual measured object values for each recognized object are input using input circuit 2 according to step 14. At least one of the following measured values or a combination thereof is determined therefrom and supplied to computing device 8 for each recognized object and for each detected preceding vehicle: distance of the object, relative speed of the object, longitudinal acceleration of the object, transverse offset of the object, transverse speed of the object, or transverse acceleration of the object. In method step 15, an acceleration gradient is determined for each measured value of each recognized object. An acceleration gradient is formed for each type of measured value (i.e., object distance for all objects, relative speed of all objects, etc.) according to a predefined computing formula or a predefined lookup table separately for each object. In this way, a total of n*m acceleration gradients is obtained for n objects using m computational formulas. The individual acceleration gradients of a single object are added up in next method step 16, so that a total of n acceleration gradients remains for n objects, since the m*n individual acceleration gradients are added up for the respective object. In this way, a single acceleration gradient is obtained for each recognized object; these objects differ with respect to whether a strong deceleration, a light deceleration, or any acceleration is needed if a given object is to be selected as the target object.

In method step 17, the instantaneous target object is selected from all recognized objects. In most cases, the target object is the directly preceding vehicle which determines the control response of the host vehicle. For example, when passing or when other vehicles cut in or cut out, a change of target object takes place, so that another vehicle is selected as the primary control object. If the instantaneous target object is selected according to step 17, the acceleration gradient for this target object computed in step 16 is converted according to step 18 to an actuating signal 11, 13, which influences either an output power-determining actuating element 10 or deceleration devices 12 of the vehicle. In the next method step 19, this actuating signal is output to output circuit 9 and relayed to the corresponding actuating elements. The method is either terminated in step 19 or reset to start in an infinite loop and begins anew with step 14.

By using the above-described device and method for regulating the speed of a motor vehicle, it is possible to determine an acceleration gradient or a deceleration gradient for cruise control of a vehicle, which is greater or less depending on the driving situation, while it corresponds to the dynamics requested by the driver based on his/her own driving experience.

What is claimed is:

1. A cruise control device for speed control in a motor vehicle having a radar sensor, the speed control being a constant-distance control if at least one preceding vehicle is detected by the radar sensor, the speed control being a constant-speed regulation if no preceding vehicle is detected by the radar sensor, the device comprising:
   means for receiving measured object values for detected objects;
   a computing device for determining an acceleration gradient for each measured value of each object and for adding-up the acceleration gradients of the measured values for each object; and
   means for outputting the added-up acceleration gradient for an object selected as a target object.

2. The device according to claim 1, wherein the means for receiving includes an input circuit, and the measured values include at least one or a combination of the following input quantities:
   an object distance,
   a relative speed of the object,
   a longitudinal acceleration of the object,
   a transverse offset of the object,
   a transverse speed of the object, and
   a transverse acceleration of the object.

3. The device according to claim 1,
   wherein the acceleration gradient for each measured value of each object is determined using a table lookup device.

4. The device according to claim 1,
   wherein a sum of the acceleration gradients for each object does not exceed a predefined limiting value which is output as a maximum.

5. The device according to claim 1,
   wherein a vehicle immediately preceding a host vehicle is selected as a target object.

6. A method for speed control in a motor vehicle having a radar sensor, the speed control being a constant-distance regulation if at least one preceding vehicle is detected by the radar sensor, the speed control being a constant-speed regulation if no preceding vehicle is detected by the radar sensor, the method comprising:

supplying measured object values for detected objects to a cruise control;

determining an acceleration gradient for each measured value of each object, using a computing device;

adding-up the acceleration gradients of the measured values for each object; and outputting the added-up acceleration gradient for an object selected as a target object.

7. The method according to claim 6, wherein the measured values include at least one or a combination of the following input quantities:

an object distance,
a relative speed of the object,
a longitudinal acceleration of the object,
a transverse offset of the object,
a transverse speed of the object, and
a transverse acceleration of the object.

8. The method according to claim 6, wherein the acceleration gradient for each measured value of each object is determined using a table lookup device.

9. The method according to claim 6, wherein a sum of the acceleration gradients for each object does not exceed a predefined limiting value which is output as a maximum by the cruise control.

10. The method according to claim 6, wherein a vehicle immediately preceding a host vehicle is selected as the target object.

* * * * *